I 1000000

US010472460B2

(12) United States Patent
Spyrou et al.

(10) Patent No.: US 10,472,460 B2
(45) Date of Patent: Nov. 12, 2019

(54) USE OF SUBSTITUTED BENZYL ALCOHOLS IN REACTIVE EPOXY SYSTEMS

(71) Applicant: Evonik Degussa GmbH, Essen (DE)

(72) Inventors: Emmanouil Spyrou, Schermbeck (DE); Martina Ortelt, Duelmen (DE); Dirk Fuchsmann, Haltem am See (DE); Britta Kohlstruk, Gladbeck (DE); Elke Gollan, Heme (DE); Andrea Henschke, Duelmen (DE); Jens Hillen, Reken (DE)

(73) Assignee: Evonik Degussa GmbH, Essen (DE)

( * ) Notice: Subject to any disclaimer, the term of this patent is extended or adjusted under 35 U.S.C. 154(b) by 436 days.

(21) Appl. No.: 14/653,037

(22) PCT Filed: Nov. 4, 2013

(86) PCT No.: PCT/EP2013/072885
§ 371 (c)(1),
(2) Date: Jun. 17, 2015

(87) PCT Pub. No.: WO2014/095139
PCT Pub. Date: Jun. 26, 2014

(65) Prior Publication Data
US 2015/0337182 A1 Nov. 26, 2015

(30) Foreign Application Priority Data
Dec. 17, 2012 (DE) .................. 10 2012 223 387

(51) Int. Cl.
C08G 59/14 (2006.01)
C09D 163/00 (2006.01)
C09J 163/00 (2006.01)

(52) U.S. Cl.
CPC ....... C08G 59/1444 (2013.01); C09D 163/00 (2013.01); C09J 163/00 (2013.01); C09J 2463/003 (2013.01)

(58) Field of Classification Search
CPC .................................................. C08G 59/144
See application file for complete search history.

(56) References Cited

U.S. PATENT DOCUMENTS 3,753,917 A * 8/1973 Spoelder .............. C08G 59/182
525/504
4,539,385 A * 9/1985 Geist ..................... C08G 59/58
525/327.3
5,066,758 A * 11/1991 Honel .................... C08G 18/58
524/901
5,693,688 A 12/1997 Priou
5,880,228 A 3/1999 Marten
6,057,476 A * 5/2000 Furukawa ............ C07C 217/28
548/503
6,458,463 B1 * 10/2002 Yoshioka ............... B05D 7/532
427/407.1
8,779,036 B2 7/2014 Spyrou et al.
2002/0106583 A1 * 8/2002 Kawamura ............ B41N 3/036
430/271.1
2003/0176519 A1 9/2003 Crivello
2005/0215749 A1 * 9/2005 Miyake .................. C08G 59/18
528/87
2006/0058468 A1 * 3/2006 Wu ......................... G03F 7/091
525/386
2008/0027169 A1 1/2008 Ortelt
2009/0071602 A1 * 3/2009 Weippert .............. C08G 59/24
156/275.5
2010/0270495 A1 * 10/2010 Arnaud .................... B24D 3/28
252/79.1
2011/0281117 A1 11/2011 Ortelt et al.
2012/0115988 A1 5/2012 Spyrou et al.
2015/0093879 A1 * 4/2015 Fujimaki ............... C09J 161/06
438/458
2015/0203629 A1 7/2015 Ortelt et al.

FOREIGN PATENT DOCUMENTS

| CN | 1860164 | 11/2006 |
|---|---|---|
| DE | 10 2009 028 019 A1 | 8/2010 |
| EP | 0 822 212 A2 | 2/1998 |
| EP | 0 822 212 A3 | 2/1998 |
| JP | H05-209109 | 8/1993 |
| JP | H08-104706 | 4/1996 |
| JP | 2002-338662 A | 11/2002 |
| JP | 2005-520007 | 7/2005 |
| JP | 2007-537319 | 12/2007 |
| WO | WO 2013/047319 A1 | 4/2013 |
| WO | WO 2014/037222 A2 | 3/2014 |

OTHER PUBLICATIONS

U.S. Appl. No. 14/766,226, filed Aug. 6, 2015, Ortelt, et al.
International Search Report dated Jan. 28, 2014 in PCT/EP2013/072885.

* cited by examiner

Primary Examiner — Megan McCulley
(74) Attorney, Agent, or Firm — Grüneberg and Myers PLLC

(57) ABSTRACT

The present invention relates to the use of substituted benzyl alcohols as modifiers in epoxy systems.

20 Claims, No Drawings

USE OF SUBSTITUTED BENZYL ALCOHOLS IN REACTIVE EPOXY SYSTEMS

The present invention relates to the use of substituted benzyl alcohols as modifiers in epoxy systems.

Epoxy resins, in particular those produced from bisphenol A and epichlorohydrin, are known raw materials for the production of high-quality casting resins, coating compositions and adhesives. These aromatic epoxy resins, cured by way of example with polyamines, have not only good resistance to chemicals and to solvents but also good adhesion on many substrates.

Modifiers are often used nowadays in epoxy systems. They increase the reactivity of the amines used and at the same time reduce the viscosity of the formulation, thus simplifying processing. Familiar modifiers are under pressure from legislation relating to the environment, since they often have a low boiling point and therefore escape from the formulation by evaporation or by diffusion. Replacement materials with higher boiling points have been tested, but have not exhibited the required viscosity-reducing effect, or shortened pot life undesirably or exhibited an inadequate reactivity increase.

There continues therefore to be a requirement for alternative modifiers which do not have the disadvantage of the prior art.

It is therefore an object of the present invention to provide novel modifiers which, in standard epoxy formulations, do not escape by evaporation and which not only have adequate viscosity-reducing effect but also contribute to maximal heat resistance.

Surprisingly, it has been found that specifically substituted benzyl alcohols which in particular have a boiling point of at least 240° C. meet the abovementioned requirements in a particular manner.

The present invention therefore firstly provides the use of benzyl alcohols substituted on the aromatic ring, where the ring substituents are selected from alkoxy or dialkylamino groups or from linear, branched or cyclic alkyl groups having at least three carbon atoms, as modifiers for epoxy resins.

The present invention further provides compositions, in particular reactive compositions, comprising
  A) at least one resin having epoxy groups,
  B) at least one hardener which in particular is reactive toward component A), and
  C) at least one modifier in the form of a benzyl alcohol substituted on the aromatic ring, where the ring substituents are selected from alkoxy or dialkylamino groups or from linear, branched or cyclic alkyl groups having at least three carbon atoms and
  D) optionally auxiliaries and additional substances.

Suitable resins A) having epoxy groups are described by way of example in the Patent EP 0675185: it is possible to use a wide variety of the compounds known for this purpose that comprise more than one epoxy group, preferably two epoxy groups, per molecule. These epoxy compounds (epoxy resins) can be either saturated or unsaturated, and also aliphatic, cycloaliphatic, aromatic or heterocyclic, and can also have hydroxy groups. They can moreover comprise substituents which under the conditions of mixing or of reaction do not give rise to any problematic side-reactions, examples being alkyl or aryl substituents, ether groups and the like.

Compounds preferably involved here are glycidyl ethers which derive from polyhydric phenols, in particular from bisphenols, and also from novolacs, and which have molar masses of from 100 to 500 g/mol, in particular however from 150 to 250 g/mol, based on the number of the epoxy groups $M_E$ ("epoxy equivalent weights", "EV value").

Examples that may be mentioned of polyhydric phenols are: resorcinol, hydro-quinone, 2,2-bis(4-hydroxyphenyl)propane (bisphenol A), isomer mixtures of dihydroxydiphenylmethane (bisphenol F), 4,4'-dihydroxydiphenylcyclohexane, 4,4'-di-hydroxy-3,3'-dimethyldiphenylpropane, 4,4'-dihydroxybenzophenone, bis(4-hydroxy-phenyl)-1,1-ethane, bis(4-hydroxyphenyl)-1,1-isobutane, 2,2-bis(4-hydroxy-tert-butylphenyl)propane, bis(2-hydroxynaphthyl)methane, 1,5-dihydroxynaphthalene, tris(4-hydroxyphenyl)methane, bis(4-hydroxyphenyl) ether, bis(4-hydroxyphenyl) sulphone, inter alia, and also the chlorination and bromination products of the abovementioned compounds, for example tetrabromobisphenol A.

Compounds very particularly preferred as resins A) having epoxy groups are liquid diglycidyl ethers based on bisphenol A and bisphenol F with an epoxy equivalent weight of from 180 to 190 g/mol.

It is moreover also possible to use, as resins having epoxy groups, polyglycidyl ethers of polyalcohols, e.g. 1,2-ethanediol diglycidyl ether, 1,2-propanediol diglycidyl ether, 1,3-propanediol diglycidyl ether, butanediol diglycidyl ether, pentanediol diglycidyl ether (also neopentyl glycol diglycidyl ether), hexanediol diglycidyl ether, diethylene glycol diglycidyl ether, dipropylene glycol diglycidyl ether, higher polyoxyalkylene glycol diglycidyl ethers, e.g. higher polyoxyethylene glycol diglycidyl ethers and polyoxypropylene glycol diglycidyl ethers, mixed polyoxyethylene-propylene glycol diglycidyl ethers, polyoxytetramethylene glycol diglycidyl ether, polyglycidyl ethers of glycerol, of 1,2,6-hexanetriol, of trimethylolpropane, of trimethylolethane, of pentaerythritol, of sorbitol, polyglycidyl ethers of alkoxylated polyols (e.g. of glycerol, of trimethylolpropane, of pentaerythritol, inter alia), diglycidyl ethers of cyclohexanedimethanol, of bis(4-hydroxycyclohexyl)methane and of 2,2-bis(4-hydroxycyclohexyl)propane, polyglycidyl ethers of castor oil; another example is triglycidyltris(2-hydroxyethyl)isocyanurate.

Poly(N-glycidyl) compounds can also be used as component A), and are obtainable via dehydrohalogenation of the reaction products of epichlorohydrin and amines, such as aniline, n-butylamine, bis(4-aminophenyl)methane, m-xylylenediamine or bis(4-methylaminophenyl)methane. However, among the poly(N-glycidyl) compounds are also triglycidylisocyanurate, triglycidylurazole and oligomers of these, N,N'-diglycidyl derivatives of cycloalkyleneureas and diglycidyl derivatives of hydantoins inter alia.

It is also possible to use polyglycidyl esters of polycarboxylic acids, these being obtained via the reaction of epichlorohydrin or similar epoxy compounds with an aliphatic, cycloaliphatic or aromatic polycarboxylic acid, such as oxalic acid, succinic acid, adipic acid, glutaric acid, phthalic acid, terephthalic acid, tetrahydrophthalic acid, hexahydrophthalic acid, 2,6-naphthalenedicarboxylic acid, and higher diglycidyl dicarboxylates, e.g. dimerized or trimerized linolenic acid. Examples here are diglycidyl adipate, diglycidyl phthalate and diglycidyl hexahydrophthalate.

The following as suitable resins A) may also be mentioned: glycidyl esters of unsaturated carboxylic acids and epoxidized esters of unsaturated alcohols and, respectively, of unsaturated carboxylic acids.

The amounts generally used of the resins A) having epoxy groups are from 5 to 95% by weight, preferably from 50 to 90% by weight, based on the sum of the masses of compounds A), B) and C).

Monoepoxides can be concomitantly present as reactive diluents in addition to the abovementioned polyglycidyl ethers in component A). Examples of compounds suitable for this purpose are methyl glycidyl ether, butyl glycidyl ether, allyl glycidyl ether, ethylhexyl glycidyl ether, long-chain aliphatic glycidyl ethers, e.g. cetyl glycidyl ether and stearyl glycidyl ether, monoglycidyl ethers of a higher isomeric alcohol mixture, glycidyl ethers of a mixture of C12 to C13 alcohols, phenyl glycidyl ether, cresyl glycidyl ether, p-tert-butylphenyl glycidyl ether, p-octylphenyl glycidyl ether, p-phenylphenyl glycidyl ether, glycidyl ethers of an alkoxylated lauryl alcohol, and also monoepoxides, such as epoxidized monounsaturated hydrocarbons (butylene oxide, cyclohexene oxide, styrene oxide), halogenated epoxides, e.g. epichloro-hydrin. The proportions present of the monoepoxides mentioned are up to 30% by weight, preferably from 10 to 20% by weight, based on the mass of the polyglycidyl ethers.

A detailed listing of the suitable epoxy compounds is moreover found in the handbook "Epoxidverbindungen and Epoxidharze" [Epoxy compounds and epoxy resins] by A. M. Paquin, Springer Verlag, Berlin 1958, Chapter IV, and in Lee Neville "Handbook of Epoxy Resins", 1967, Chapter 2.

It is also possible for the purposes of the present invention in each case to use a mixture of a plurality of the epoxy resins described above.

Component B) used can comprise in particular any of the known amine hardeners for 1,2-epoxides. The following may be mentioned by way of example: aliphatic amines, such as the polyalkylene polyamines, diethylenetriamine and triethylenetetramine, trimethylhexamethylenediamine, 2-methylpentanediamine, oxyalkylenepolyamines, such as polyoxypropylenedi- and -triamine and 1,13-diamino-4,7,10-trioxatridecane, cycloaliphatic amines, such as isophoronediamine (3,5,5-trimethyl-3-aminomethyl-cyclohexylamine), 4,4'-diaminodicyclohexylmethane, 2,2,4- and 2,4,4-trimethylhexamethylenediamine, 3,3'-dimethyl-4,4'-diaminodicyclohexylmethane, N-cyclohexyl-1,3-propanediamine, 1,2-diaminocyclohexane, piperazine, N-aminoethylpiperazine, TCD diamine (3(4),8(9)-bis(aminomethyl)tricyclo[5.2.1.0$^{2,6}$]decane), araliphatic amines, such as xylylenediamines, aromatic amines, such as phenylenediamines and 4,4'-diaminodiphenylmethane; adduct hardeners, these being reaction products of epoxy compounds, in particular glycidyl ether of bisphenol A and F, with excess amine,
polyamidoamine hardeners obtained via condensation of mono- and polycarboxylic acids with polyamines, in particular via condensation of dimer fatty acids with polyalkylene polyamines,
and Mannich-base hardeners obtained via reaction of mono- or polyhydric phenols with aldehydes, in particular formaldehyde, and with polyamines.

It is also possible to use Mannich bases such as those based on phenol and/or resorcinol, formaldehyde and m-xylylenediamine, and also N-aminoethylpiperazine and blends of N-aminoethylpiperazine with nonylphenol and/or benzyl alcohol. Phenalkamines are moreover also suitable and are often obtained in a Mannich reaction from cardanols, aldehydes and amines. It is also possible to use mixtures of the abovementioned amine hardeners.

The amounts generally used of the hardeners B) are from 0.01 to 50%, preferably from 1 to 40%, based on the sum of the masses of the compounds A), B) and C).

Compounds that can be used as modifiers C) according to the invention are any of the benzyl alcohol derivatives in the form of a benzyl alcohol substituted on the aromatic ring, where the ring substituents are selected from alkoxy or dialkylamino groups or from linear, branched or cyclic alkyl groups having at least three carbon atoms. It is essential that the compounds mentioned have a boiling point of at least 240° C.

In principle, there is no restriction in respect of the position and the number of the substituents on the aromatic ring. It is preferable that only one other ring substituent is present alongside the hydroxymethyl group of the benzyl alcohol. In the case of the alkoxy groups and of the linear branched or cyclic alkyl groups having at least three carbon atoms, these are preferably in 4-position (para-position) with respect to the hydroxymethyl group of the benzyl alcohol. The location of the dialkylamino groups is in particular in 3- or 4-position (meta- or para-position) with respect to the hydroxy-methyl group of the benzyl alcohol.

Suitable alkoxy groups are any of the alkoxy groups having from 1 to 20 carbon atoms, in particular having from 1 to 8 carbon atoms, particular preference being given to methoxy and ethoxy groups.

The alkyl group of the dialkylamino groups has from 1 to 20 carbon atoms, preferably from 1 to 8 carbon atoms. It is particularly preferable that the alkyl group of the dialkylamino groups involves methyl, ethyl, propyl or butyl groups.

The linear, branched or cyclic alkyl groups have at least three carbon atoms, preferably from 3 to 8 carbon atoms, particular preference being given here to propyl, isopropyl or butyl.

It is preferable to use 4-methoxybenzyl alcohol, 3-dimethylaminobenzyl alcohol and 4-isopropylbenzyl alcohol.

The amounts generally used of the modifiers C) are from 0.1 to 30% by weight, preferably from 5 to 20% by weight, based on the sum of the masses of the compounds A), B) and C).

The composition according to the invention can also comprise, alongside components A), B) and C), other conventional auxiliaries and other conventional additional substances D), for example accelerators or curing catalysts, further hardeners and additional curable resins or extender resins, and also the additives conventionally used in coatings, for example pigments, pigment pastes, dyes, antioxidants, stabilizers, levellers and thickeners (agents having thixotropic effect), antifoams and/or wetting agents, reactive diluents, fillers, plasticizers, flame-retardant materials and the like. The said additives can optionally be added to the curable mixtures well in advance or only directly before processing.

Examples of materials that can be used as accelerators, in particular for curing by the two-component method with amine hardeners, are phenols and alkylphenols having from 1 to 12 carbon atoms in the alkyl group, cresol, the various xylenols, nonyl-phenol, polyphenols, such as bisphenol A and F, aromatic carboxylic acids containing OH groups, for example salicylic acid, m-hydroxybenzoic acid, p-hydroxybenzoic acid, and also tertiary amines, such as benzyldimethylamine, 1,3,5-tris(dimethylamino)phenol, mixtures of N-aminoethylpiperazine and alcoholamines (cf. DE-A 29 41 727), Accelerator® 399 (Texaco Chemical Company) and the like. It is also possible to use inorganic substances, e.g. acids, bases or salts such as calcium nitrate.

Examples of levelling agents that can be used are acetals, such as polyvinyl formal, polyvinyl acetal, polyvinyl butyral, polyvinyl acetobutyral inter alia, polyethylene glycols and polypropylene glycols, silicone resins, mixtures of zinc soaps, of fatty acids and of aromatic carboxylic acids; particular examples here being commercially available products based on polyacrylates. It is also possible that amounts of from 0.1 to 4% by weight, preferably from 0.2 to 2.0% by weight, of the levelling agents have been added to component A).

Adhesion promoters and hydrophobizing agents that can be used are inter alia silanes. These can react with an inorganic substrate and also with the organic polymers to form strong bonds. Appropriate products are supplied by way of example as Dynasylan® by Evonik Industries AG.

The dyes and pigments can be of inorganic or else organic type. Examples that may be mentioned are titanium dioxide, zinc oxide, carbon black, and conductive carbon black, e.g. Printex XE 2 from Orion Engineered Carbon. Selection of the organic dyes and pigments is to be such that they are stable at the curing temperatures and do not cause any unacceptable discolouration.

Examples of suitable fillers are quartz powder, silicates, chalk, gypsum, kaolin, mica, baryte, organic fillers, e.g. polyamide powder, organic and inorganic fibres and the like. Examples of thickeners and agents with thixotropic effect that can be used are Aerosil® (fine-particle silicon dioxide, examples being the grades 150, 200, R 202, R 805 from Evonik Industries AG), bentonite grades (e.g. Sylodex® 24 from Grace), and also Bentone® (NL Chemicals).

Constituents A)-D) are mixed intimately with one another at room temperature in suitable assemblies (e.g. stirred tanks, static mixers, extruders, or the like).

The composition according to the invention can be used for the coating and adhesive bonding of a very wide variety of materials, for example of light-weight or other metals, or else of non-metallic materials, such as ceramic, glass, leather, textiles, rubber, wood and/or plastic.

The present invention therefore also provides the use of the abovementioned compositions as coating compositions, in sealant applications, in composites or as adhesive.

The compositions according to the invention are applied to the substrates by the known processes, such as spreading, rolling or deposition in the form of adhesive bead, from suitable assemblies.

By using the preferred amine hardeners B) described above it is now in principle possible to cure the compositions according to the invention comprising components A), B) and C) at room temperature. Although the properties achieved in the cured system at these relatively low temperatures are sometimes not ideal, a higher temperature is often not permitted by the application, for example in the case of coatings on floors. The curing temperature of the composition according to the invention is generally from 5 to 260° C., preferably from 20 to 200° C. The curing time at temperatures of from 20 to 200° C. is generally from 10 minutes to 14 days. Preference is given to hardening at room temperature, where a particularly preferred period is from 1 hour to 1 week.

A feature of the resultant coatings is adequate heat resistance that cannot be achieved with the known modifiers: in particular, the coatings resist a temperature of more than 30° C., after one day, and also a temperature of more than 40° C. after 7 days. At the same time, the initial viscosity does not rise here beyond 5000 mPas. In another advantage of the present invention, escape of the modifier by evaporation is reduced, and it is thus possible to comply with legislation relating to the environment without any need to accept sacrifices in respect of the performance of the resultant coatings.

Even in the absence of further details, it is assumed that a person skilled in the art can utilize the above description to the fullest possible extent. The preferred embodiments and examples are therefore to be interpreted merely as descriptive, and certainly not as in any way limiting disclosure.

Examples are used below for further explanation of the present invention. Alternative embodiments of the present invention are obtainable analogously.

EXAMPLES

In order to determine and compare the properties of the modifiers, standard epoxy formulations are prepared. To this end, 100 parts of isophoronediamine (Vestamin® IPD from Evonik Industries AG) as component B) are mixed with 441 parts of Epikote™ 828 (bisphenol A diglicidyl ether from Momentive) as component A) with use of 88 parts of modifier (component C).

Table 1 shows the results.

TABLE 1

| | | Example | | | |
|---|---|---|---|---|---|
| | | 1*) Benzyl alcohol | 2) 4-Methoxy-benzyl alcohol | 3) 4-Isopropyl-benzyl alcohol | 4) 3-Dimethyl-amino-benzyl alcohol |
| Vestamin® IPD | % by wt. | 100 | 100 | 100 | 100 |
| Epikote™ 828 | % by wt. | 441 | 441 | 441 | 441 |
| Modifier | % by wt. | 88 | 88 | 88 | 88 |
| Boiling point of modifier | [° C.] | 206 | 258 | 249 | 282 |
| Viscosity | [mPas] | 1100 | 1500 | 1350 | 1960 |
| Heat resistance (HDT) DIN EN ISO 75-1 - curing: 23° C./50% H | | | | | |
| after 1 day | ° C. | 38 | 36 | 34 | 35 |
| after 2 days | ° C. | 48 | 41 | 42 | 43 |
| after 7 days | ° C. | 58 | 47 | 48 | 51 |

TABLE 1-continued

|  |  | Example | | | |
| --- | --- | --- | --- | --- | --- |
|  |  | 5*) Methoxy-propanol | 6*) Propoxy-ethanol | 7*) Isophorone | 8*) Benzyltoluene (Marlotherm LH) |
| Vestamin IPD | % by wt. | 100 | 100 | 100 | 100 |
| Epikote 828 | % by wt. | 441 | 441 | 441 | 441 |
| Modifier | % by wt. | 88 | 88 | 88 | 88 |
| Boiling point of modifier | [° C.] | 119-122 | 150-153 | 215 | 278-282 |
| Viscosity | [mPas] | n.d. | n.d. | n.d. | n.d. |
| Heat resistance (HDT) DIN EN ISO 75-1 - curing: 23° C./50% H | | | | | |
| after 1 day | ° C. | <20 | <20 | brittle | brittle |
| after 2 days | ° C. | 35 | 30 | brittle | brittle |
| after 7 days | ° C. | 50 | 50 | brittle | brittle |

*Comparative Examples not according to the invention
H: humidity

From these data it can be seen that only the Examples according to the invention exhibit advantageous technical properties, in particular adequate heat resistance (≥30° C. after one day, and also ≥40° C. after 7 days), initial viscosity below 5000 mPas and boiling point above 240° C. The boiling point of benzyl alcohol (Example 1) is too low, while the remaining Comparative Examples (Examples 5-8) exhibit inadequate heat resistance.

The invention claimed is:

1. A composition comprising:
   A) at least one resin having epoxy groups,
   B) at least one amine hardener,
   C) at least one modifier in the form of a benzyl alcohol further substituted on a carbon atom of the aromatic ring with a ring substituent, wherein the ring substituent is selected from the group consisting of an alkoxy group, a dialkylamino group, a linear alkyl having at least four carbon atoms, a, branched alkyl having at least four carbon atoms, and a cyclic alkyl group having at least four carbon atoms, and, optionally,
   D) at least one auxiliary,
   wherein said composition excludes an epoxy novolac, and,
   wherein in component C), only one other ring substituent is present alongside hydroxymethyl group of the benzyl alcohol.

2. The composition according to claim 1, wherein component A) comprises glycidyl ethers which derive from polyhydric phenols and which have molar masses, based on the number of the epoxy groups, of from 100 to 500 g/mol.

3. The composition according to claim 1, wherein component A) comprises at least one monoepoxide as a reactive diluent.

4. The composition according to claim 1, wherein the component B) comprises at least one selected from the group consisting of aliphatic amines, oxyalkylenepolyamines, cycloaliphatic amines, araliphatic amines, aromatic amines, adduct hardeners, these being reaction products of epoxy compounds with excess amine, polyamidoamine hardeners obtained via condensation of mono- and polycarboxylic acids with polyamines, Mannich-base hardeners obtained via reaction of mono- or polyhydric phenols with aldehydes and with polyamines, or phenalkamines.

5. The composition according to claim 1, wherein component C) comprises a benzyl alcohol selected from the group consisting of 4-methoxybenzyl alcohol and 3-dimethylaminobenzyl alcohol.

6. The composition according to claim 1, wherein an amount of the at least one modifier C) is from 5 to 20% by weight, based on the sum of the masses of the compounds A), B) and C).

7. A coating composition, a sealant, a composite or an adhesive comprising the composition of claim 1.

8. The coating composition according to claim 7 which has a curing temperature ranging from 5 to 260° C.

9. A reactive epoxy system comprising the composition according to claim 1.

10. An adhesive comprising the reactive epoxy system according to claim 9.

11. A coating comprising the reactive epoxy system according to claim 9.

12. The coating of claim 11 which has been cured.

13. A coating composition, a sealant, a composite or an adhesive comprising:
   the composition of claim 1,
   wherein an amount of the at least one modifier C) is from 5 to 20% by weight, based on the sum of the masses of the compounds A), B) and C), and
   wherein the coating composition has a curing temperature of from 5 to 260° C.

14. The composition according to claim 1, wherein said at least one auxiliary is present and is at least one auxiliary selected from the group consisting of an accelerator, a further hardener, an additional curable resin, an extender resin, a pigment, a pigment paste, a dye, an antioxidant, a stabilizer a thickener, an antifoam, a wetting agent, a reactive diluent, a filler, a plasticizer or a flame-retardant material.

15. The composition according to claim 1, wherein said ting substituent is selected from the group consisting of alkoxy group(s) and dialkylamino group(s).

16. A method of coating an object comprising applying the coating composition according to claim 1 to said object and, optionally, curing the composition.

17. A method for bonding objects together comprising applying the coating composition according to claim 1 to at least one object and curing the composition.

18. A composition comprising:
A) at least one resin having epoxy groups,
B) at least one amine hardener,
C) at least one modifier in the form of a benzyl alcohol further substituted on at least one carbon atom of the aromatic ring with at least one ring substituent, wherein the ring substituent(s) are selected from the group consisting of alkoxy group(s), dialkylamino group(s), linear alkyl having at least four carbon atoms, branched alkyl having at least four carbon atoms, and cyclic alkyl having at least four carbon atoms, and, optionally,
D) at least one auxiliary,
wherein said composition excludes an epoxy novolac, and
wherein a boiling point of the at least one modifier is at least 240° C., and wherein the composition is capable of curing to produce a cured coating with a heat resistance of more than 30° C. after one day.

19. A coating composition, sealant, composite or adhesive, comprising:
a composition, which comprises:
A) at least one resin having epoxy groups,
B) at least one amine hardener,
C) at least one modifier in the form of a benzyl alcohol further substituted on at least one carbon atom of the aromatic ring with at least one ring substituent, wherein the ring substituent(s) are selected from the group consisting of alkoxy group(s), dialkylamino group(s), linear alkyl having at least four carbon atoms, branched alkyl having at least four carbon atoms, and cyclic alkyl groups having at least four carbon atoms, and, optionally,
D) at least one auxiliary,
wherein said composition excludes an epoxy novolac,
wherein an amount of the at least one modifier C) is from 5 to 20% by weight, based on the sum of the masses of the compounds A), B) and C),
wherein the coating composition, sealant, composite or adhesive has a curing temperature of from 5 to 260° C.,
wherein a boiling point of the at least one modifier is at least 240° C., and
wherein the composition is capable of curing to produce a cured coating with a heat resistance of more than 30° C. after one day.

20. The coating composition of claim 19, wherein the viscosity of the composition is at most 5000 mPa·s.

* * * * *